United States Patent [19]
Baillie

[11] Patent Number: 5,176,467
[45] Date of Patent: Jan. 5, 1993

[54] OIL BOOM

[75] Inventor: Lloyd A. Baillie, Plano, Tex.

[73] Assignee: Atlantic Richfield Company, Los Angeles, Calif.

[21] Appl. No.: 803,832

[22] Filed: Dec. 9, 1991

[51] Int. Cl.⁵ ............................................. E02B 15/08
[52] U.S. Cl. ...................................... 405/68; 405/62; 405/72
[58] Field of Search .................. 405/60, 62, 63, 66, 405/68, 72; 210/242.1, 242.2, 242.3, 923

[56]         References Cited
U.S. PATENT DOCUMENTS

| 3,665,713 | 5/1972 | Rath | 405/62 |
| 3,762,169 | 10/1973 | Graham | 405/62 |
| 3,802,201 | 4/1974 | Hoult et al. | 405/68 |

FOREIGN PATENT DOCUMENTS

| 1296856 | 5/1962 | France | 405/62 |
| 953743 | 4/1964 | United Kingdom | 405/62 |

Primary Examiner—David H. Corbin
Attorney, Agent, or Firm—Joseph D. Yao

[57]            ABSTRACT

An oil boom for containing floating oil spills having an hose with a plurality of tubing members mounted to the periphery of the hose. Each tubing member has a nozzle assembly for directing an air jet stream against an oil spill along the top surface of the water. The oil boom is preferably connected to a tow line by a pair of connecting lines which are in a criss-cross pattern, allowing the hose to form a wave-like configuration so that the air hose may rise and fall with the movement of the surface of the water independent of the tow line.

10 Claims, 2 Drawing Sheets

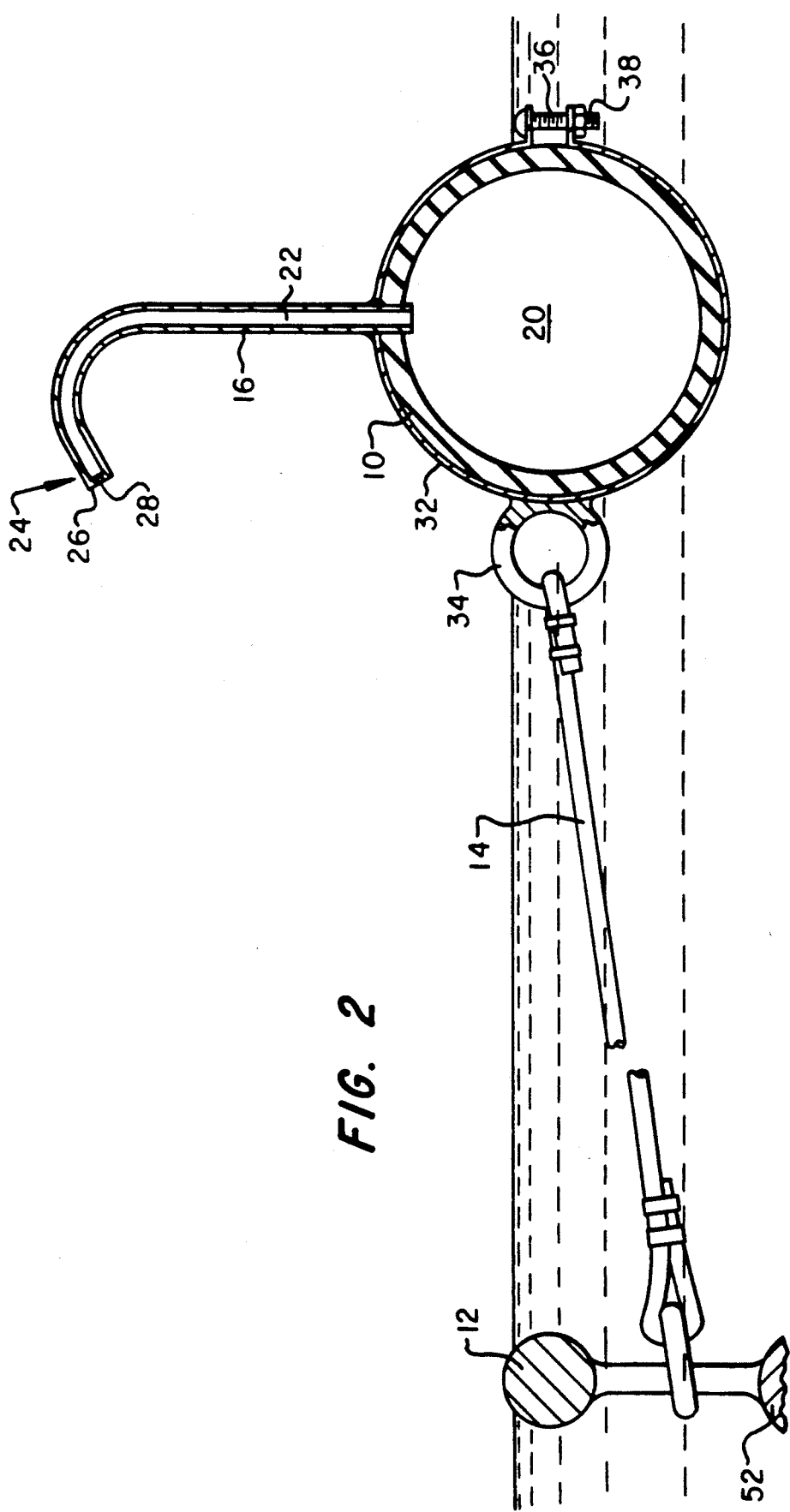

OIL BOOM

BACKGROUND OF THE INVENTION

1. Field of the Invention

This invention relates to an improved oil boom for containing a floating oil spill.

2. Background

Oil booms are devices used to contain oil spills on the open water and to prevent oil spills from spreading to environmentally sensitive areas. The booms may be stationary or towed by vehicles to concentrate the floating oil for recovery and removal from the water.

The current oil boom designs are bulky, difficult to store and difficult to deploy rapidly. These designs are generally inadequate for inclement weather on the open seas because rough waves can carry the oil over and onto the other side of the oil boom, defeating containment.

The oil booms that are used to concentrate the floating oil to a specific area are towed under tension. The resulting rigid oil boom will not always remain on top of the water surface, thereby increasing the likelihood of waves carrying oil over the boom, even when the boom is equipped with floats having excess buoyancy. Tension from being towed causes the oil boom with floats to resist the pressures of the water and, therefore, submerges the boom below the water line. Also, weathered crude oil may have the specific gravity of close to one and may be carried under the boom as the boom is towed through the water.

SUMMARY OF THE INVENTION

In accordance with the present invention, an oil boom has a hose with a main conduit and a plurality of tubing members mounted to the periphery of the hose, wherein a secondary conduit within the tubing member is in communication with the main conduit. On the opposite end of the tubing member is a nozzle assembly that directs a stream of air received through the main and secondary conduits to strike against oil floating on the surface of the water. The nozzle assembly has a head having an opening smaller than the secondary conduit to create an air jet force that more effectively moves the oil along the water surface. Alternatively, the nozzle assembly includes, instead of a single opening, an elongated head having a plurality of aligned openings directed at the oil along the top of the water.

A preferred embodiment of the oil boom includes a tow line that is joined to the hose by connecting lines so that the air hose is in a wave-like configuration and is allowed to rise and fall with the surface of the water, independent of the tow line, and to provide containment of the oil slick.

Objects, features and advantages of this invention are to provide an oil boom which can contain and concentrate an oil slick efficiently and effectively through a simplified and economical design, manufacture and assembly.

BRIEF DESCRIPTION OF THE DRAWINGS

These and other objects, features and advantages of the invention will be apparent from the following detailed description, appended claims and accompanying drawings in which:

FIG. 2 is a sectional view of a first embodiment of the oil boom; and

DESCRIPTION OF A PREFERRED EMBODIMENT

Figure 1:
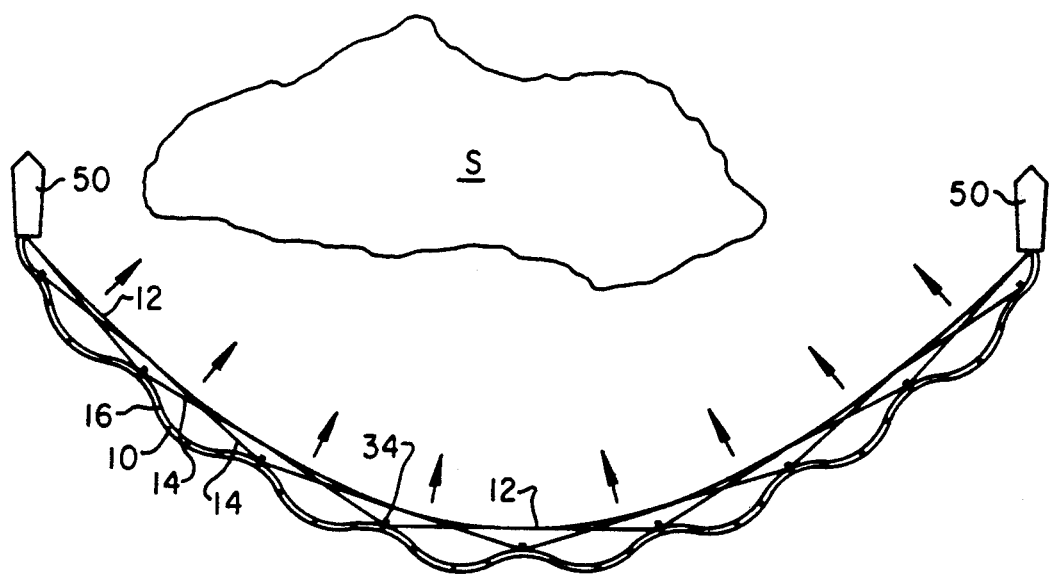
FIG. 1 is a plan view of an oil boom embodying this invention.

With specific reference to FIGS. 1 and 2, an oil boom includes a hose 10, a tow line 12 and connecting lines 14 disposed between the hose 10 and the tow line 12.

As shown in FIG. 2, the hose 10, preferably made of an airtight reinforced PVC, has a plurality of tubing members 16 mounted to the periphery of the hose 10. The hose 10 has a main conduit 20 that is in communication with a secondary conduit 22 of each tubing member 16. On the upper end of the tubing member 16 is a nozzle assembly 24 having a head 26 having an opening 28 preferably smaller than the diameter of the secondary conduit 22. The tubing member 16 is shown with a bend in the upper end to point the opening 28 to direct an air jet stream toward the surface of the water and to impinge against as oil spill S.

To hold the tubing member 16 in place on the periphery of the hose 10, an adjustable band 32 is secured to the tubing member 16 and wrapped around the hose 10. The band 32 is tightened around the hose 10 to secure the tubing member 16 to hose 10 by way of a bolt 36 and nut 38 (See FIG. 2). The band 32 includes an integral ring 34 to receive connecting line 14.

Figure 3:
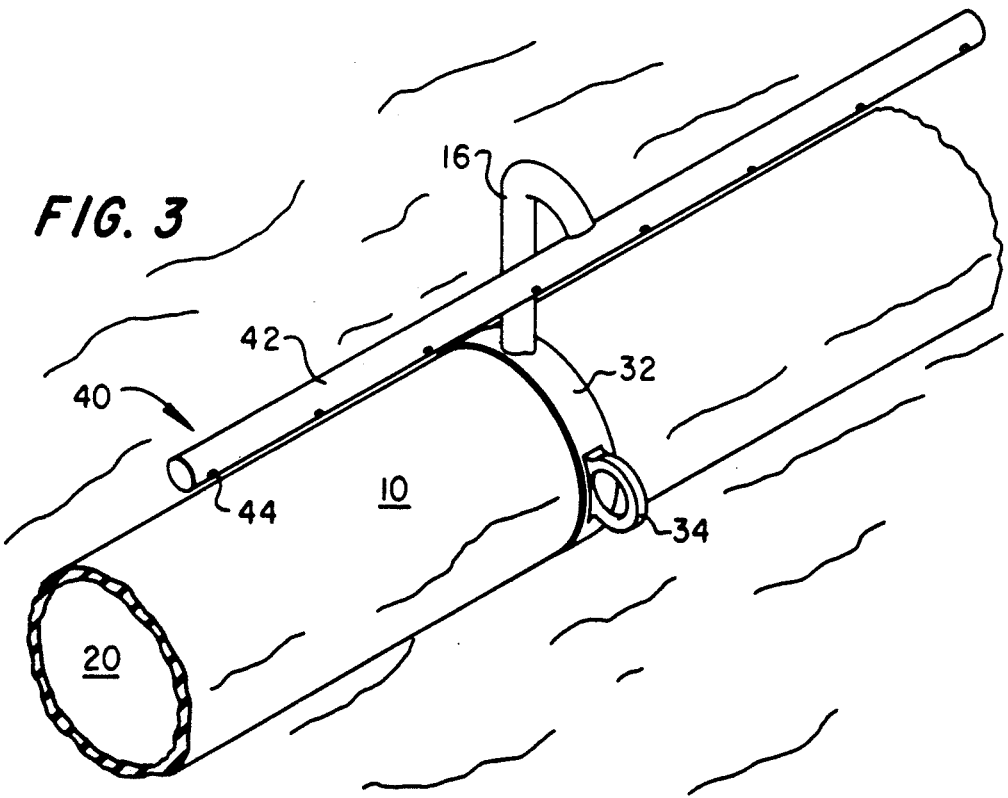
FIG. 3 is a perspective view of an alternate embodiment of the oil boom.

An alternate embodiment, as shown in FIG. 3, includes a nozzle assembly 40 having an elongated head 42 that runs parallel to the hose 10 itself and includes a plurality of aligned openings 44 on the periphery of the elongated head 42. The elongated head 42 may be manufactured of the same tubing as tubing member 16 and have a similar secondary conduit as a tubing member 16. All the openings 44 are aligned and are pointed toward the oil spill along the top surface of the water.

The tow line 12, as shown in FIG. 2, generally is submerged below the top surface of the water by a plurality of weights 52 which are attached intermittently along the length of the tow line 12. The tow line 12 is kept at least two feet in front of the hose 10 by attaching each connecting line 14 to the tow line 12 every twenty-four feet and by attaching each connecting line 14 to the ring 34 on the hose 10 every twenty-six feet. As shown in FIG. 1, the connecting lines 14 are in a criss-cross rope pattern between the hose 10 and the tow line 12. This results in the hose 10 forming a wave-like configuration behind the tensioned tow line 12.

In operation, the tow line 12 has each end attached to the rear of the tow vehicles 50, while the hose 10 is attached to an air compressor mounted on one or both of the tow vehicles 50, depending on the length of the air hose, size of the compressor and the air pressure requirements. The longer the hose, the greater the pressure loss or drop, which must be compensated by increasing initial air pressure in the hose. This requires an increase in the horsepower of the compressor in order to provide the needed air flow though the nozzle openings.

As shown in FIG. 1, the tow vehicles 50 encircle the oil spill S to contain, move and concentrate the oil spill S. As the tow line 12, which is under tension, moves toward the oil spill S, the openings 28 or 44 direct a jet stream of air along the top surface of the water which impinges against the oil and causes it to move in a direction away from the oil boom at speeds that may approach up to two miles per hour. The oil may contact the tow line 12, which is in tension and submerged, but because of the criss-cross pattern of the connecting lines 14 which form the hose 10 in a wave-like configuration, the hose 10 is free to float along the top surface of the water and to provide continuous air flow against the oil spill S. Even in inclement weather or choppy seas, if the waves are high enough to break over the oil boom, because the tubing member 16 extends above the hose 10, the air jet flow will still be directed onto the oil spill to prevent it from escaping containment of the oil boom.

The tow vehicles 50 may use the oil boom to either prevent the oil from reaching environmentally safe areas and/or concentrate the oil spill and direct it toward an oil recovery system. Because the air jet flow from openings 28, 44 moves the oil away from the oil boom without actually allowing the oil to touch the oil boom, there is a better chance of concentrating the oil slick rather than simply containing it. When sufficiently concentrated, recovery equipment can pick up and remove the oil more efficiently and effectively.

It is to be understood that the terminology as employed in the description and claims incorporated herein is used by way of description and by way of limitation, to facilitate understanding of the structure, function and operation of the combination of elements which constitute the present invention. Moreover, while the foregoing description and drawings illustrate in detail working embodiments of the invention, to those skilled in the art to which the present invention relates, the present disclosure will suggest many modifications in construction, as well as widely differing embodiments and applications without thereby departing from the spirit and scope of the invention. The present invention, therefore, is intended to be limited only by the scope of the appended claims and the applicable prior art.

What is claimed is:

1. An oil boom comprising:
   a. a hose having a main conduit;
   b. a plurality of tubing members having a secondary conduit, said tubing member having a first end vertically mounted on said hose and a second end bent downward;
   c. an air compressor to provide air through said main and said secondary conduits; and
   d. a nozzle assembly attached to said bent second end, so that said nozzle assembly is directed toward the oil spill on the top surface of the water.

2. The oil boom as set forth in claim 1 wherein said nozzle assembly comprises an elongated head having a plurality of horizontally aligned openings, said elongated head mounted on said second tubing member is parallel with said hose, whereby said aligned openings are directed at the oil spill on the top surface of the water.

3. The oil boom as set forth in claim 1 further comprises a tow line and a connecting line joining said hose and said tow line so that said hose follows behind said tow line and floats along the top surface of the water.

4. The oil boom as set forth in claim 3 further comprises a second connecting line, wherein said first and second connecting lines are attached in a criss-cross pattern between said tow line and said hose so as to allow said hose to form a wave-like configuration behind said tow line to provide flexibility to ride along the top surface of the water.

5. The oil boom as set forth in claim 4 wherein each said connecting line is joined every 26 feet to said hose and attached every 24 feet to said tow line.

6. The oil boom as set forth in claim 4 further comprises a plurality of weights attached intermittently along the length of said tow line.

7. The oil boom as set forth in claim 6 wherein each said connecting line is joined every 26 feet to said hose and attached every 24 feet to said tow line.

8. An oil boom comprising:
   a. a hose having a main conduit;
   b. a plurality of tubing members having a secondary conduit, each said tubing member having a first end mounted on said hose;
   c. an air compressor to provide air through said main and said secondary conduits;
   d. a nozzle assembly attached to a second end of said tubing member so that said nozzle assembly is directed toward the oil spill on the top surface of the water;
   e. a tow line;
   f. a first connecting line and second connecting line, wherein said first and said second connecting lines are attached in a crisscross pattern between said tow line and said hose so as to allow said hose to form a wave-line configuration behind said tow line to provide flexibility to ride along the top surface of the water.

9. The oil boom as set forth in claim 8 further comprises a plurality of weights attached intermittently along the length of said tow line.

10. The oil boom as set forth in claim 9, wherein each said connecting line is joined every 26 feet to said hose and attached every 24 feet to said tow line.

* * * * *